US005560975A

United States Patent [19]

Casper

[11] Patent Number: 5,560,975

[45] Date of Patent: Oct. 1, 1996

[54] DECORATING SYSTEM

[75] Inventor: William P. Casper, Fond du Lac, Wis.

[73] Assignee: Casper Enterprises, Inc., Fond du Lac, Wis.

[21] Appl. No.: 266,649

[22] Filed: Jun. 28, 1994

[51] Int. Cl.$^6$ .................................................... B32B 9/00

[52] U.S. Cl. .............................. 428/99; 428/100; 248/99; 248/100; 24/370; 24/371; 24/373; 24/378

[58] Field of Search ......................... 428/99, 100; 24/370, 24/371, 369, 373, 374, 375, 376, 378, 598.4, 598.5, 598.2, 598.7; 248/99, 100

[56] References Cited

U.S. PATENT DOCUMENTS 4,909,466 3/1990 Matthews .................................. 24/27

*Primary Examiner*—Patrick Ryan

*Assistant Examiner*—Abraham Bahta

*Attorney, Agent, or Firm*—Donald Cayen

[57] ABSTRACT

A decorating system enables decorative articles to be hung from high places with safety. The decorating system comprises a dual hook and an adapter. The dual hook has a ring, a first hook, and a second hook. The decorative article is held by the second hook. The adapter is attached to the end of a pole. The adapter has a finger that is insertable into the dual hook ring. A person manipulates the pole to locate the dual hook first hook over a selected support member. The dual hook is lowered slightly to rest the first hook thereof on the support member. Then the adapter finger is removed from the dual hook ring. To take down the decorative article, the adapter finger is reinserted into the dual hook ring, and the pole is manipulated to lift the dual hook off the support member and return the dual hook and decorative article to the ground.

21 Claims, 3 Drawing Sheets

DECORATING SYSTEM

BACKGROUND OF THE INVENTION

1. Field of the Invention

This invention pertains to ornamentation, and more particularly to apparatus for hanging decorations from high places.

2. Description of the Prior Art

It has long been a major chore to hang decorative articles from locations high above ground. The usual solution is for a person to stand on a ladder or stool to reach the desired location. In many situations, the person needs both hands to manipulate the article. Without a hand for support, he is prone to losing his balance and falling.

Trimming tall trees with Christmas decorations presents a particularly difficult challenge. Because of the conical shape of most trees, the person must lean toward the top of the tree as he hangs decorations there. Such leaning increases the likelihood of a fall.

Perhaps the most difficult and dangerous decorating job is hanging lights on outdoor trees. Those trees are often so tall that step ladders or stools are of little use. Extension ladders also are not suitable, because the only lateral support for them comes from the trees themselves. Because of the difficulties of hanging lights on outdoor trees, many people merely throw the lights onto the branches. However, the lights rarely stay in place for long, and the job looks haphazard at best.

Thus, a need exists for a way to more easily trim tall trees and other high places.

SUMMARY OF THE INVENTION

In accordance with the present invention, an economical decorating system is provided that enables decorative articles to be hung high above ground level in a safe and convenient manner. This is accomplished by apparatus that includes a dual hook that is manipulated by an adapter on the end of a long pole.

The dual hook is constructed as a ring and two legs that are coplanar with and project from the ring. One of the legs has an axial centerline that may radiate from the ring longitudinal axis. The two legs cooperate to form a first hook at their junction with the ring. One leg defines one or more lobes that face the other leg.

The free end of one leg terminates in a sharp reverse bend so as to form a second hook. The opening of the second hook preferably defines a wedge shape. The second hook lies in the same plane as the ring.

The adapter may be integral with the end of the pole. In that case, the adapter comprises a finger on one end of a short bar. The other end of the bar is fixed to the pole. Alternately, the adapter may be a separate piece that is removably attachable to the pole. For example, the adapter may comprise a bar having one end joined to a threaded tube that mates with threads on the end of the pole. The other end of the bar terminates in a finger.

In use, a selected decorative article is held by the second hook of the dual hook. The decorative article may be held by any means appropriate to the particular article. For some articles, a piece of string or thread can be looped through the article and over the second hook. The present invention is especially useful for decorating trees with strings of lights, because their wires can be easily wedged tightly into the second hook.

The finger on the adapter is inserted through the ring of the dual hook. Then the pole is raised to place the first hook of the dual hook slightly above a selected support member. The pole is manipulated to lower the first hook onto the support member. With the first hook resting on the support member, the adapter finger is removed from the ring. The dual hook remains in place, supported by its first hook on the support member and holding the decorative article at the desired location. In tree trimming applications, the lobes on one of the legs of the first hook cooperate with the other leg to aid in retaining the dual hook on different size tree branches.

The decorative article is taken down by reversing the process. The pole is raised to insert the finger into the dual hook ring, and the dual hook is raised off the support member. Then the dual hook and decorative article are lowered to the ground.

The method and apparatus of the invention, using the combination of a dual hook and an adapter on a pole, thus enables high places to be decorated with ease and safety by a person standing on the ground. The dual hook can hold numerous types of decorative articles reliably in place on a variety of support members.

Other advantages, benefits, and features of the present invention will become apparent to those skilled in the art upon reading the detailed description of the invention.

DETAILED DESCRIPTION OF THE PREFERRED EMBODIMENTS

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 3:
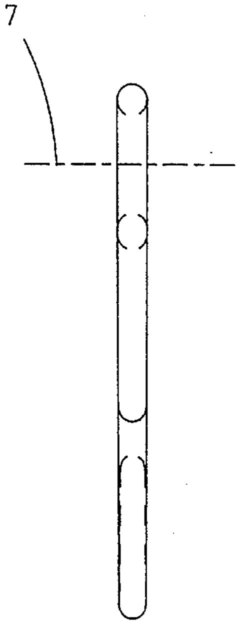
FIG. 3 is another side view of the dual hook of FIG. 1.
Figure 1:
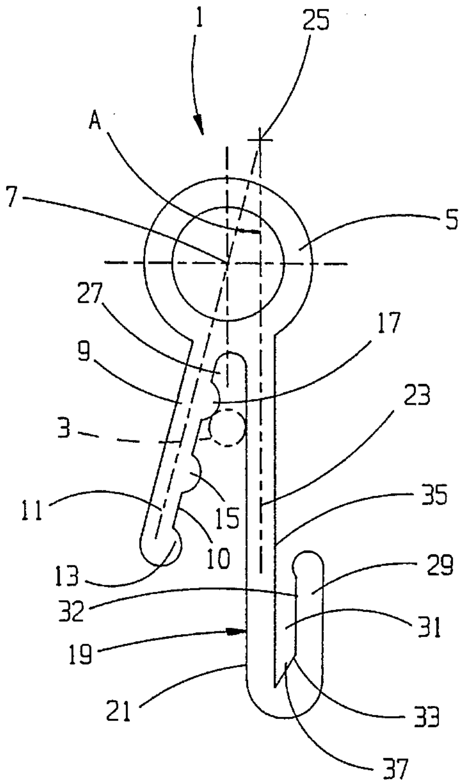
FIG. 1 is a front view of a dual hook according to the present invention.
Figure 2:
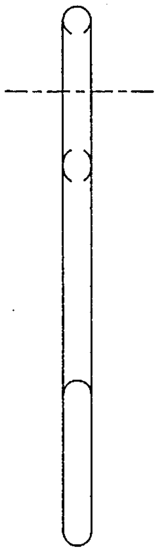
FIG. 2 is a side view of the dual hook of FIG. 1.

Referring to FIGS. 1–3, a dual hook 1 is illustrated that includes the present invention. The dual hook 1 is particularly useful for holding various decorative items from a support member, typified by phantom line 3, located high above ground. However, it will be understood that the invention is not limited to ornamental applications.

The dual hook 1 is fabricated as a ring 5 that has a longitudinal axis 7. Projecting from the ring 5 is a first leg 9 and a second leg 19. The first and second legs 9 and 19 have respective inwardly facing surfaces 10 and 21. The inward facing surfaces 10 and 21 are closely spaced near their junctions with the ring. Consequently, the first and second legs cooperate to form a first hook 27. The surface 10 of the first leg is formed with one or more lobes; in the illustrated construction, three lobes 13, 15, and 17 are depicted. The lobes 13, 15, and 17 lie in the same plane as the ring and first leg. If desired, the lobes may be formed on the second leg surface 21 rather than on the first leg.

The first leg 9 has an axial centerline 11 and the second leg 19 has an axial centerline 23. Preferably, at least one of the centerlines 11 or 23 intersects the longitudinal axis 7 of the ring 5. In the particular construction illustrated, the centerline 11 is shown as intersecting the ring longitudinal axis, and the centerline 23 intersects the centerline 11 at a point 25 that is located on the opposite side of the ring longitudinal axis as the first leg. The axial centerlines 11 and 23 make an angle A.

The second leg 19 is preferably longer than the first leg 9. At the free end of the second leg is a sharp reverse bend 29 that cooperates with the first leg to form a second hook 31. The second hook 31 is on the opposite side of the second leg as the first hook 27. The inner surface 32 of the reverse bend 29 has a straight portion 33 that cooperates with the surface 35 of the first leg such that the second hook 21 defines a wedge 37. The reverse bend 29 lies in the same plane as the ring 5.

The dual hook 1 may be made from any suitable material. A molded nylon plastic material is satisfactory. Preferable dimensions for the dual hook include an inner diameter of approximately 0.75 inches for the ring 5, a length of approximately 1.32 inches for the first leg 9, and a length of approximately 2.5 inches for the second leg 19. The angle A between the first and second legs is approximately 15 degrees. The length of the reverse bend 29 is approximately 0.72 inches.

Figure 4:
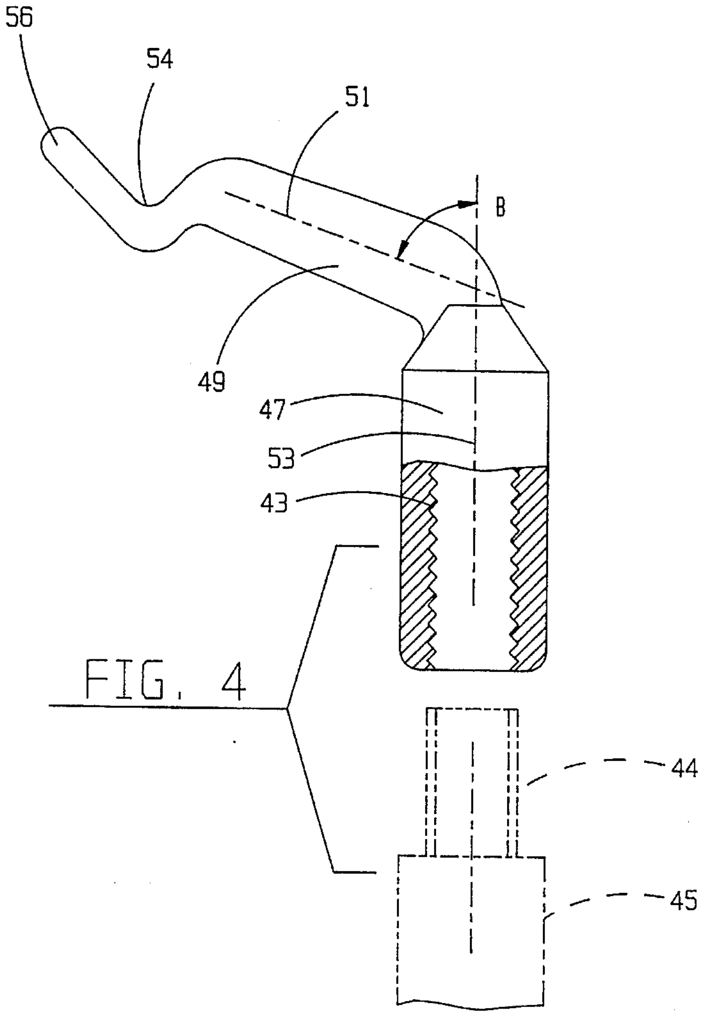
FIG. 4 is an exploded front view of the adapter of the present invention together with a pole, the view of the adapter being partially broken.
Figure 5:
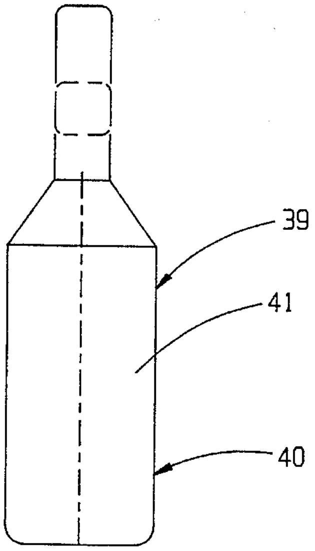
FIG. 5 is a side view of the adapter of FIG. 4.

Now turning to FIGS. 4 and 5, the adapter 39 of the present invention is shown. In the preferred embodiment, the adapter 39 is removably attachable to a long pole 45. The adapter 39 comprises a tubular section 41. One end of the tubular section 41 has internal threads 43 that mate with a threaded end 44 of the pole 45. It is contemplated that a conventional paint pole having well known threads will be commonly used with the adapter of the present invention. Joined to the opposite end 47 of the tubular section is a bar 49. Although the centerline 51 of the bar 49 may make any of numerous angles B with the centerline 53 of the tubular section, I prefer an angle of approximately 60 degrees. At the distal end of the bar 49 is a depression 54, such that the distal end of the bar forms a finger 56. Satisfactory dimensions for the adapter 39 include a length for the tubular section of approximately two inches and a length of the bar of approximately 1.75 inches. The adapter may be manufactured from a molded nylon plastic material.

Figure 6:
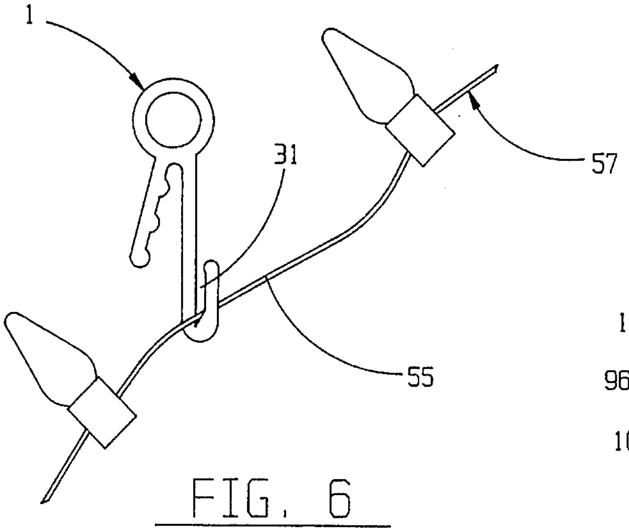
FIG. 6 is a perspective view of a dual hook holding a string of lights.
Figure 7:
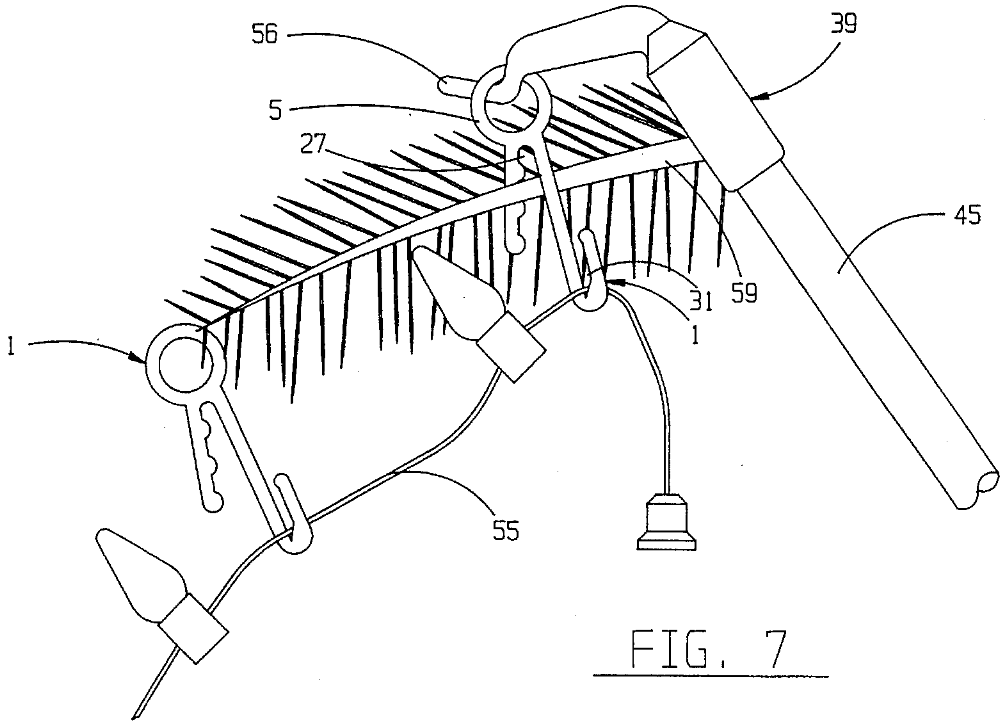
FIG. 7 is a perspective view of the present invention in use to hang the dual hook and a string of lights.

The adapter 39 in conjunction with the dual hook 1 comprises the decorating system of the present invention. To use the decorating system, the adapter is screwed tightly onto the threads 44 of a pole 45. Any of a wide variety of decorative articles is appropriately placed in the second hook 31 of the dual hook. For illustration purposes, it will be assumed that a string of lights 57 is to be hung from a tree using the decorating system. See FIGS. 6 and 7. In that case, a person pushes the second hook 31 of a dual hook over the wire 55 of the light set 57. The wedge 37 of the second hook holds the wire 55 firmly in place. I have found that a spacing of approximately 20 inches between dual hooks works very well for trimming outdoor trees.

When all the dual hooks 1 are assembled to the light string 57, the person takes the pole 45 and inserts the finger 56 of the adapter 39 through the ring 5 of the dual hook 1 at one end of the light string 57. He raises the pole 45, and thus the dual hook and the light string, and manipulates the pole to place the dual hook slightly above a desired branch 59 at the top of the tree. He locates the first hook 27 of the dual hook over the branch 59, and then lowers the dual hook until the first hook rests on the branch. A gentle pull on the light string helps to set the first hook on the branch. The branch thus becomes the support member shown as reference numeral 3 in FIG. 1. The lobes 13, 15, and 17 on the dual hook first leg 9 enable the first hook to accommodate different diameter branches without difficulty. With the dual hook in place on the branch, the person extracts the adapter finger from the dual hook ring 5. He then inserts the adapter finger through the ring of the next dual hook along the light string and repeats the process. The pole and adapter are used until all the lights that are out of reach of the person's arms are set on the tree. The lights on the lower portion of the tree may be set by hand, that is, by grasping the dual hooks by hand and locating and lowering them onto the desired tree branches. Using my invention, I have decorated a ten-foot tree with 48 hooks in approximately 25 minutes while standing on the ground in complete safety.

When it is desired to take the light string 57 down from the tree, the person grasps and lifts by hand the dual hooks 1 that are within his reach off the lower tree branches 59. He uses the pole 45 and adapter 39 to remove the lights on the upper tree branches by inserting the adapter finger 56 into the ring 5 of the lowermost dual hook remaining on the tree. He lifts that dual hook off its branch, and lets it hang by the wire 55. He progresses to all the other remaining dual hooks, removing the highest one last. In that manner, the tree is untrimmed with ease and safety.

Figure 8:
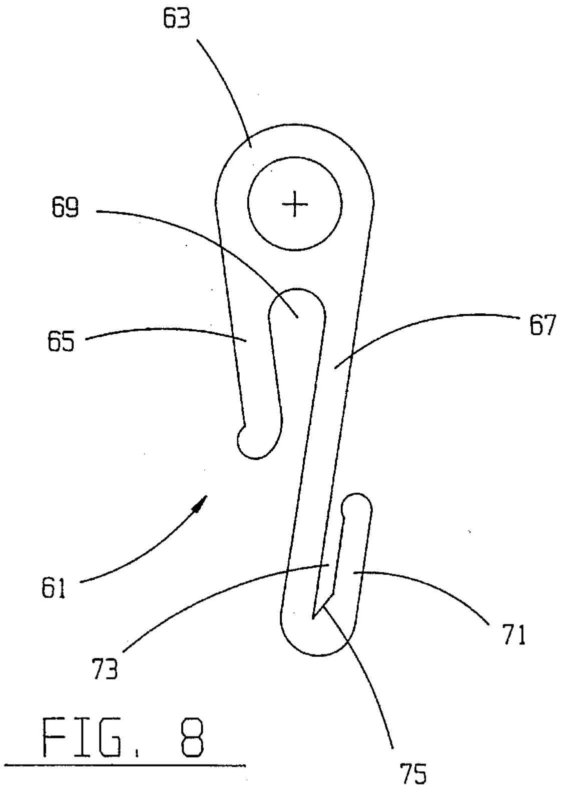
FIG. 8 is a front view of a modified dual hook according to the invention.

FIG. 8 shows a modified dual hook 61 according to the present invention. The dual hook 61 has a ring 63, a first leg 65, and a second leg 67. The first and second legs 65 and 67, respectively, are tangent to the ring 63 and non-parallel to each other. The legs 65 and 67 cooperate with the ring 63 to form a first hook 69. A reverse bend 71 cooperates with the second leg 67 to form a second hook 73. The second hook 73 has a wedge section 75. The dual hook 61 may be molded from a nylon or other plastic material, and it is used in substantially the same manner as the dual hook 1 described previously in connection with FIGS. 1–7.

Figure 9:
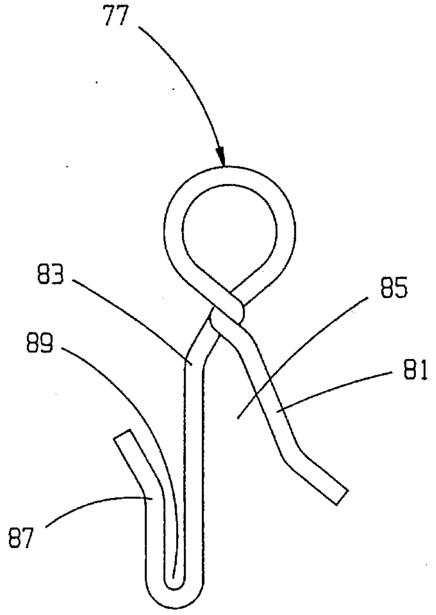
FIG. 9 is a front view of another embodiment of the present invention.

FIG. 9 illustrates another modified embodiment of the present invention in the form of a dual hook 77. The dual hook 77 is designed to be manufactured from a length of wire and bent into the appropriate shape. The wire of the dual hook 77 defines a ring 79, a first leg 81, and a second leg 83. The first and second legs 79 and 81, respectively, cooperate to form a first hook 85. A reverse bend 87 cooperates with the second leg 83 to create a second hook 89. The dual hook 77 is used in substantially the same way as the dual hooks 1 and 61 described previously.

Figure 10:
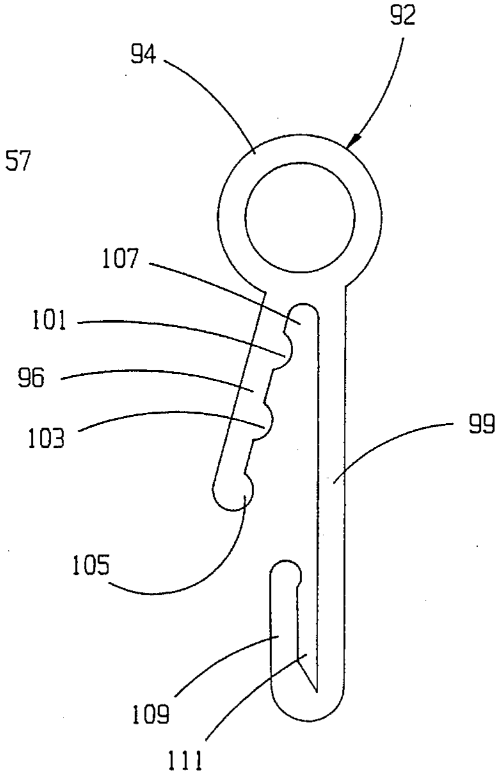
FIG. 10 is a front view of another modified dual hook.

It is not necessary that the first and second hooks of a dual hook be located on opposite sides of the dual hook second leg. Looking at FIG. 10, a dual hook 97 has a ring 94, a first leg 96, and a second leg 99. The first leg 96 has lobes 101, 103, and 105. The first and second legs 96 and 99, respectively, cooperate to form a first hook 107. There is a reverse bend on the free end of the second leg 99 that is generally under the first leg 96. The reverse bend 109 cooperates with the second leg to form a second hook 111 that is on the same side of the second leg as the first hook 107.

Figure 11:
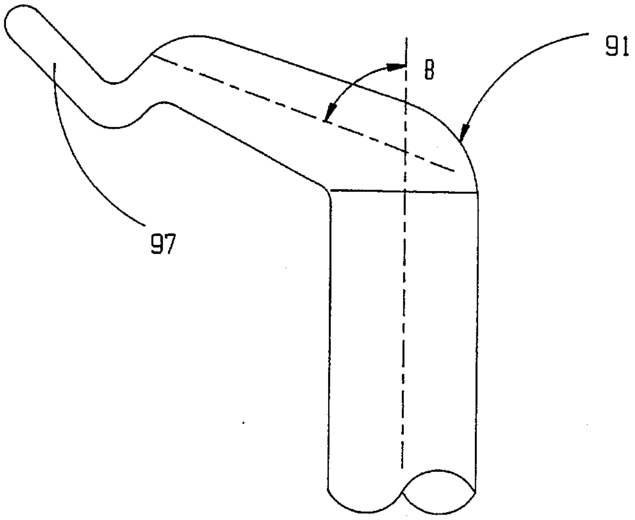
FIG. 11 is a front view of an alternate construction for the adapter of the present invention.
Figure 12:
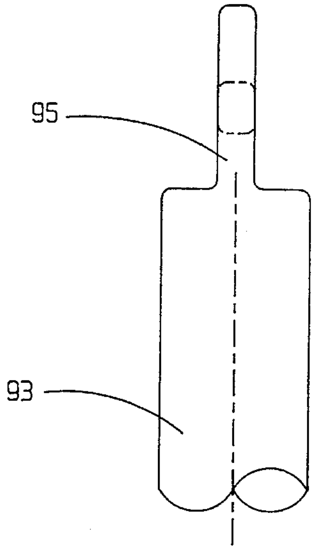
FIG. 12 is a side view of FIG. 11.

In FIGS. 11 and 12, an alternate design for the adapter is shown. The adapter 91 of FIGS. 11 and 12 is integral with a pole 93. In that design, a bar 95 is joined directly to the pole 93. The distal end of the bar 95 defines a finger 97. The integral pole and adapter are used in the same manner as the separate pole 45 and adapter 39 discussed above in connection with FIGS. 4–7.

In summary, the results and advantages of decorative articles hung from high places can now be more fully realized. The decorating system of the present invention provides both a way to easily reach the high places and complete safety when doing so. This desirable result comes from using the combined functions of the dual hook and the adapter. The dual hook holds the decorative article. By means of a long pole, the adapter lifts the dual hook and decorative article from the ground and places the dual hook onto a selected support member. After the adapter has been removed from the dual hook, the dual hook and decorative article remain in place until they are taken down from the support member by reverse manipulation of the pole and adapter.

It will also be recognized that in addition to the superior performance of the decorating system, its construction is such as to be of very small cost. Consequently, for only minimal capital expenditure, diverse users such as homeowners and school personnel can simultaneously enhance their environments while improving upon the safety of their past decorating practices. Also, since the components of the invention are of rugged design and construction, the need for maintenance is practically nonexistent.

Thus, it is apparent that there has been provided, in accordance with the invention, a decorating system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A decorating system comprising:

a. hook means for hanging a selected decorative article therefrom; and b. adapter means removably insertable into the hook means for manipulating the hook means to be supported on a selected support member and thereby decorate the support member with the decorative article, wherein the hook means comprises:

i. ring means for removably receiving the adapter means; and ii. leg means projecting from the ring means to define a first hook that rests on the support member and thereby supports the hook means on the support member.

2. The decorating system of claim 1 wherein:

a. the leg means comprises first and second legs projecting from the ring means and cooperating to form the first hook; and b. the hook means further comprises a reverse bend connected to the second leg and cooperating therewith to form a second hook.

3. The decorating system of claim 2 wherein:

a. the ring means comprises a rigid closed ring that defines a longitudinal axis; and b. the first and second legs define respective axial centerlines, the axial centerline of at least one of the first and second legs intersecting the ring means longitudinal axis.

4. The decorating system of claim 2 further comprises lobe means formed on the first leg for cooperating with the second leg to enable the first hook to support the dual hook on support members of different sizes.

5. The decorating system of claim 2 wherein at least one of the first and second legs is formed with at least one lobe in facing relation to the other of the first and second legs.

6. The decorating system of claim 2 wherein:

a. the ring means comprises a generally circular ring; and b. the first and second legs extend generally tangentially from the ring.

7. The decorating system of claim 2 wherein the reverse bend connects to the second leg on the opposite side thereof as the first leg, so that the first and second hooks are on opposites side of the second leg.

8. The decorating system of claim 2 wherein the reverse bend connects to the second leg on the same side thereof as the first leg, so that the first and second hooks are on the same side of the second leg.

9. The decorating system of claim 1 wherein the adapter means comprises:

a. a finger removably insertable into the ring means of the hook means; and b. bar means for joining the finger to a pole, so that the pole can be manipulated to insert the finger into the ring means of the hook means and to manipulate the hook means into support on the support member.

10. The decorating system of claim 1 wherein the adapter means comprises:

a. tube means for attaching to a pole;

b. a finger; and c. a bar having a first end joined to the finger and a second end joined to the tube means, so that the pole can be manipulated to insert the finger into the ring means of the hook means and to manipulate the hook means into support on the support member.

11. Apparatus for hanging decorative articles comprising:

a dual hook comprising:

i. a ring that defines a longitudinal axis;

ii. first hook means projecting from the ring for resting on a selected member and thereby supporting the dual hook on the selected member; and iii. second hook means for holding a selected decorative item; and b. adapter means for manipulating the dual hook to support the dual hook on the selected member.

12. The apparatus of claim 11 wherein the first hook means of the dual hook comprises first and second legs projecting from the ring and cooperating with each other to form a first hook, the first and second legs having respective inwardly facing surfaces.

13. The apparatus of claim 12 wherein the inwardly facing surfaces of at least one of the first and second legs is formed with at least one lobe thereon that aids in supporting the dual hook on the selected member.

14. The apparatus of claim 12 wherein:

a. the ring is rigid and closed;

b. the first and second legs define respective axial centerlines; and c. the axial centerline of at least one of the first and second legs intersects the longitudinal axis of the ring.

15. The apparatus of claim 12 wherein the first and second legs project generally tangentially from the ring.

16. The apparatus of claim 11 wherein the adapter comprises:

a. a finger that is removably insertable into the dual hook ring; and b. bar means for attaching the finger to a long pole, so that a person can manipulate the pole to support the dual hook on a selected support member located high above the ground.

17. The apparatus of claim 11 wherein the adapter means comprises:

a. a finger that is removably insertable into the ring of the dual hook;

b. an adapter having a first end that is removably attachable to a pole and a second end; and c. a bar joining the finger to the adapter second end, so that the pole can be used to manipulate the dual hook into being supported on a selected support member located high above ground.

18. An article of manufacture useful for decorating a selected support member with a decorative article comprising:

a. a ring defining a longitudinal axis;

b. first and second legs projecting from the ring and defining respective axial centerlines and having respective inwardly facing surfaces, the first and second legs cooperating to form a first hook that can rest on the support member and thereby support the article of manufacture on the support member; and c. a reverse bend on the second leg and cooperating therewith to form a second hook that holds the decorative article.

19. The article of manufacture of claim 18 wherein the inwardly facing surface of at least one of the first and second legs is formed with at least one lobe thereon that aids the first hook to rest on the support member.

20. The article of manufacture of claims 18 wherein the first and second legs project generally tangentially from the ring.

21. The article of manufacture of claim 18 wherein the second hook is on the same side of the second leg as the first hook.

* * * * *